(12) United States Patent
Felt et al.

(10) Patent No.: US 11,527,163 B2
(45) Date of Patent: Dec. 13, 2022

(54) SERVER FOR COMMUNICATING WITH MOBILE AND VEHICLE DEVICES

(71) Applicant: Verizon Patent and Licensing Inc., Basking Ridge, NJ (US)

(72) Inventors: Michelle Felt, Randolph, NJ (US); Nader Gharachorloo, Ossining, NY (US); Afshin Moshrefi, Newburyport, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

(21) Appl. No.: 16/948,431

(22) Filed: Sep. 18, 2020

(65) Prior Publication Data

US 2021/0005087 A1 Jan. 7, 2021

Related U.S. Application Data

(63) Continuation of application No. 16/385,497, filed on Apr. 16, 2019, now Pat. No. 10,783,791, which is a (Continued)

(51) Int. Cl.

| | |
|---|---|
| *G08G 1/00* | (2006.01) |
| *G06F 16/9537* | (2019.01) |
| *G06Q 10/06* | (2012.01) |
| *G06Q 10/08* | (2012.01) |
| *G06Q 30/06* | (2012.01) |

(Continued)

(52) U.S. Cl.
CPC ......... *G08G 1/202* (2013.01); *G01C 21/3438* (2013.01); *G06F 16/9537* (2019.01); *G06Q 10/02* (2013.01); *G06Q 10/0631* (2013.01); *G06Q 10/08* (2013.01); *G06Q 30/0613* (2013.01); *G06Q 50/30* (2013.01); *H04W 4/025* (2013.01); *H04W 4/40* (2018.02)

(58) Field of Classification Search
CPC .......... G08G 1/202; G01C 21/3438; G06F 16/9537; G06Q 10/02; G06Q 10/0631; G06Q 10/08; G06Q 30/0613; G06Q 50/30; H04W 4/025; H04W 4/40
See application file for complete search history.

(56) References Cited

U.S. PATENT DOCUMENTS 5,168,451 A * 12/1992 Bolger ................... G08G 1/202
340/994
5,736,940 A 4/1998 Burgener
(Continued)

FOREIGN PATENT DOCUMENTS

| EP | 2116968 A1 * | 11/2009 | ............. G06Q 30/02 |
|---|---|---|---|
| WO | 2007/071976 | 6/2007 | |
| WO | 2009/100481 | 8/2009 | |

*Primary Examiner* — Curtis J King

(57) ABSTRACT

One or more servers may include a first communication interface to communicate with a mobile device; a second communication interface to communicate with devices associated with a plurality of vehicles; and a selection mechanism. The first communication interface may receive, via a network, a request from the mobile device based on an interaction with the mobile device. And, the selection mechanism may determine weighted scores for two or more, of the plurality of vehicle, and select one of the two or more vehicles by using a selection function that improves access to vehicle services and decreases waste of resources used by the plurality of vehicles.

20 Claims, 9 Drawing Sheets

Related U.S. Application Data continuation of application No. 15/964,537, filed on Apr. 27, 2018, now Pat. No. 10,297,157, which is a continuation of application No. 12/607,782, filed on Oct. 28, 2009, now Pat. No. 10,002,198.

(51) Int. Cl.
| | |
|---|---|
| *G06Q 50/30* | (2012.01) |
| *H04W 4/40* | (2018.01) |
| *G01C 21/34* | (2006.01) |
| *G06Q 10/02* | (2012.01) |
| *H04W 4/02* | (2018.01) |

(56) References Cited

U.S. PATENT DOCUMENTS

| | | | |
|---|---|---|---|
| 5,945,919 A | 8/1999 | Trask | |
| 5,973,619 A | 10/1999 | Paredes | |
| 6,128,559 A * | 10/2000 | Saitou | G05D 1/0295 |
| | | | 701/1 |
| 6,157,315 A * | 12/2000 | Kokubo | G07B 15/00 |
| | | | 340/432 |
| 6,185,487 B1 * | 2/2001 | Kondo | B60L 53/65 |
| | | | 701/1 |
| 6,194,854 B1 * | 2/2001 | Uchibori | B60L 53/67 |
| | | | 318/568.1 |
| 6,437,688 B1 * | 8/2002 | Kobayashi | G08G 1/166 |
| | | | 340/436 |
| 6,571,197 B1 * | 5/2003 | Frank | G01G 23/3728 |
| | | | 702/175 |
| 6,615,046 B1 | 9/2003 | Ur | |
| 6,711,500 B2 | 3/2004 | Chen | |
| 6,756,913 B1 | 6/2004 | Ayed | |
| 6,850,153 B1 * | 2/2005 | Murakami | B60R 25/2018 |
| | | | 340/5.2 |
| 6,850,898 B1 * | 2/2005 | Murakami | B60L 53/305 |
| | | | 705/13 |
| 6,947,881 B1 * | 9/2005 | Murakami | G06Q 10/0631 |
| | | | 701/1 |
| 7,113,864 B2 | 9/2006 | Smith et al. | |
| 7,813,970 B1 * | 10/2010 | Brandwine | G06Q 30/0633 |
| | | | 705/26.1 |
| 8,145,536 B1 * | 3/2012 | Goel | G06Q 10/02 |
| | | | 705/26.1 |
| 10,366,378 B1 | 7/2019 | Han et al. | |
| 10,417,589 B2 | 9/2019 | Zhao et al. | |
| 10,496,977 B2 | 12/2019 | Ruder et al. | |
| 2001/0037174 A1 | 11/2001 | Dickerson | |
| 2001/0056363 A1 | 12/2001 | Gantz et al. | |
| 2002/0019760 A1 * | 2/2002 | Murakami | G06Q 10/08 |
| | | | 705/7.25 |
| 2002/0120475 A1 | 8/2002 | Morimoto | |
| 2003/0046117 A1 * | 3/2003 | Jaehn | G06Q 30/06 |
| | | | 705/5 |
| 2003/0090363 A1 * | 5/2003 | Ogura | G07F 17/244 |
| | | | 340/5.4 |
| 2003/0125994 A1 * | 7/2003 | Jaehn | G06Q 30/0283 |
| | | | 705/5 |
| 2003/0177020 A1 | 9/2003 | Okamura | |
| 2004/0106399 A1 | 6/2004 | Ki | |
| 2004/0236502 A1 | 11/2004 | Nozaki et al. | |
| 2005/0143095 A1 | 6/2005 | Jacob | |
| 2005/0227620 A1 | 10/2005 | Morimoto | |
| 2006/0059023 A1 | 3/2006 | Masinsky | |
| 2007/0027825 A1 | 2/2007 | Pearce et al. | |
| 2007/0083327 A1 * | 4/2007 | Brice | G06Q 10/00 |
| | | | 701/410 |
| 2007/0088498 A1 | 4/2007 | Pazos et al. | |
| 2007/0093247 A1 | 4/2007 | Yaqub | |
| 2007/0198311 A1 * | 8/2007 | Menendez | G06Q 10/02 |
| | | | 705/5 |
| 2007/0294229 A1 * | 12/2007 | Au | G06F 16/951 |
| 2008/0059206 A1 * | 3/2008 | Jenkins | G06Q 99/00 |
| | | | 705/500 |
| 2008/0300973 A1 | 12/2008 | Dewitt et al. | |
| 2009/0143965 A1 | 6/2009 | Chang et al. | |
| 2009/0216600 A1 * | 8/2009 | Hill | G06Q 30/02 |
| | | | 705/7.14 |
| 2009/0313077 A1 | 12/2009 | Wheeler | |
| 2009/0326991 A1 | 12/2009 | Wei et al. | |
| 2010/0042453 A1 * | 2/2010 | Scaramellino | G06Q 10/06 |
| | | | 705/308 |
| 2010/0106623 A1 * | 4/2010 | Menendez | G06F 40/174 |
| | | | 705/26.1 |
| 2010/0174703 A1 | 7/2010 | Dandekar et al. | |
| 2010/0280700 A1 * | 11/2010 | Morgal | G06Q 10/02 |
| | | | 705/5 |
| 2011/0022545 A1 * | 1/2011 | Durney | G06Q 50/04 |
| | | | 705/500 |
| 2011/0029358 A1 * | 2/2011 | Hyde | G07C 5/008 |
| | | | 705/14.1 |
| 2011/0047149 A1 | 2/2011 | Vaananen | |
| 2011/0074350 A1 * | 3/2011 | Kocher | B60L 53/14 |
| | | | 320/109 |
| 2011/0279083 A1 * | 11/2011 | Asai | B60L 11/1846 |
| | | | 320/109 |
| 2014/0172727 A1 * | 6/2014 | Abhyanker | G06Q 30/0645 |
| | | | 705/307 |
| 2015/0094968 A1 * | 4/2015 | Jia | G05B 15/02 |
| | | | 702/60 |
| 2016/0027307 A1 * | 1/2016 | Abhyanker | G08G 1/202 |
| | | | 701/117 |

* cited by examiner

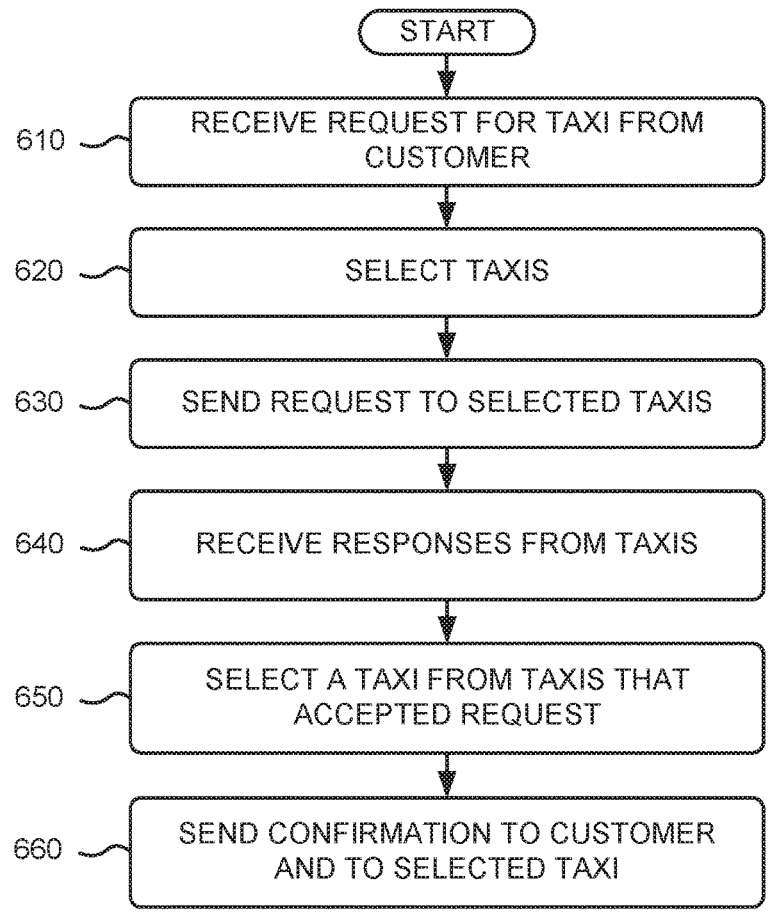
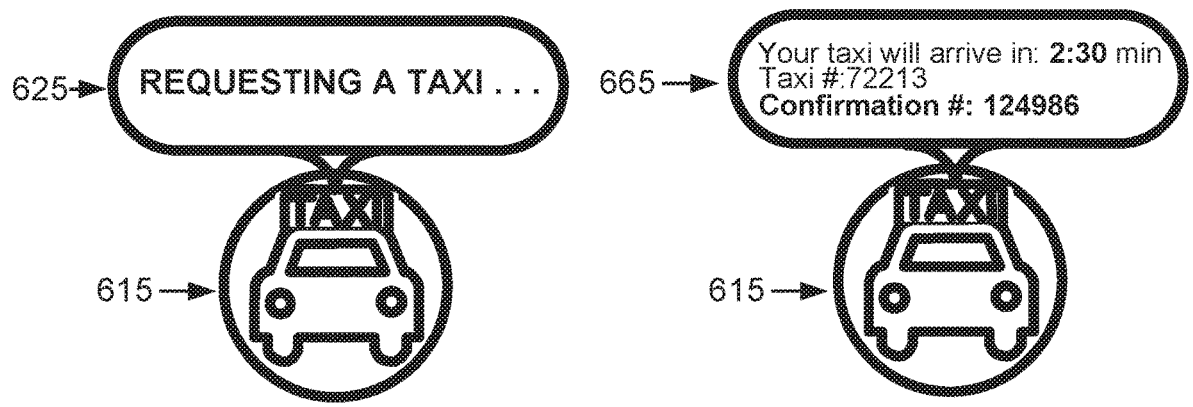
FIG. 6A
FIG. 6B
FIG. 6C

SERVER FOR COMMUNICATING WITH MOBILE AND VEHICLE DEVICES

RELATED APPLICATIONS

This application is a continuation of U.S. patent application Ser. No. 16/385,497, entitled "SERVER FOR COMMUNICATING WITH MOBILE AND VEHICLE DEVICES," filed Apr. 16, 2019 (now U.S. Pat. No. 10,783,791), which is a continuation of U.S. patent application Ser. No. 15/964,537, entitled "SERVER FOR COMMUNICATING WITH MOBILE AND VEHICLE DEVICES," filed Apr. 27, 2018 (now U.S. Pat. No. 10,297,157), which is a continuation of U.S. patent application Ser. No. 12/607,782, entitled "MOBILE TAXI DISPATCH SYSTEM," filed Oct. 28, 2009 (now U.S. Pat. No. 10,002,198), which are incorporated herein by reference.

BACKGROUND INFORMATION

Taxicabs are a well known form of public transport for a single passenger or a small group of passengers. Taxicabs (also known as taxis) may differ from other forms of public transport in that taxicabs may not have fixed schedules or routes set by the service provider. Rather, taxis may pick up a passenger based on the passenger's specified place and time, and may drop the passenger off at the passenger's specified destination.

BRIEF DESCRIPTION OF THE DRAWINGS

FIG. 6A is a flow diagram illustrating a process for dispatching a taxi according to an exemplary implementation;

FIGS. 6B-6C illustrate an exemplary customer interface in accordance with the process of FIG. 6A;

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

Implementations describe herein may relate to a mobile taxi dispatch service. A mobile taxi dispatch system may allow users (also referred to herein as 'customers,' or as 'passengers') to find a taxi cab easily and conveniently, anytime and anywhere, without a long waiting time, by using a mobile communication device, such as, for example, a cellular phone.

Figure 1:
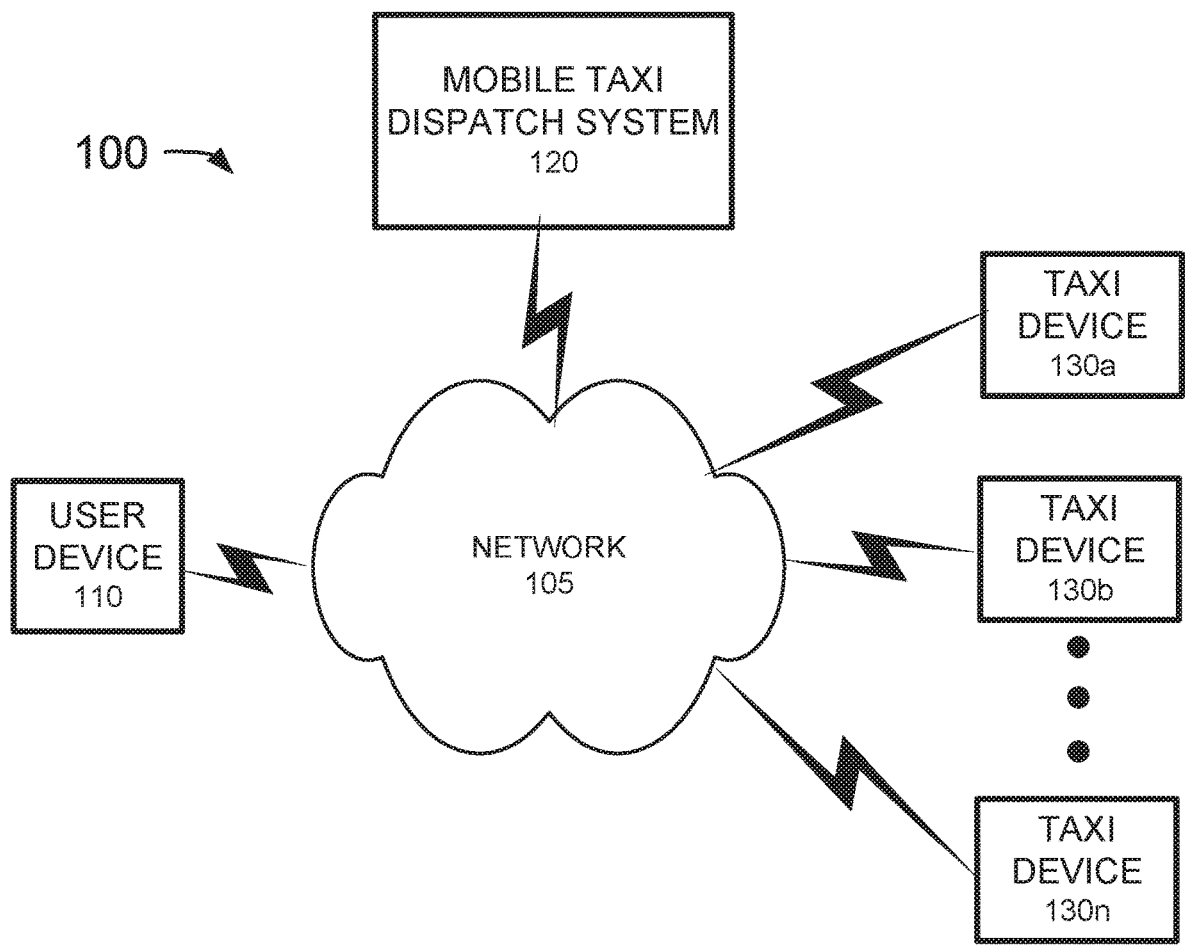
FIG. 1 is a diagram illustrating an overview of an operation of a mobile taxi dispatch service according to implementation described herein.

FIG. 1 is a diagram illustrating an overview of a mobile taxi dispatch service 100 according to the exemplary implementations described herein. Mobile taxi dispatch service 100 may include a network 105, a user device 110, a mobile taxi dispatch system 120, and one or more taxi devices 130a-130n.

Network 105 may include a circuit-switched network or a packet-switched network. For example, network 130 may include one or more of a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

User device 110 may include any communication device that a user may use to communicate with mobile taxi dispatch system 120. For example, user device 110 may include a mobile communication device, such as a mobile phone, a personal digital assistant (PDA), or a media playing device with communication capabilities; a desktop device, such as a personal computer or a workstation; a laptop computer; a telephone terminal; or any other communication device or combinations thereof. User device 110 may connect to network 105 via a wired or a wireless connection.

Mobile taxi dispatch system 120 may include one or more devices capable of performing the functions of a mobile taxi dispatch system as described herein. For example, mobile taxi dispatch system 120 may include one or more servers.

Taxi devices 130a-130n may include any communication devices associated with taxis that may communicate with mobile taxi dispatch system 120. For example, taxi devices 130a-130c may include communication devices mounted in a taxi vehicle, such as a dashboard radio transceiver; communication devices associated with drivers of taxi vehicles, such as mobile phones (or personal digital assistants (PDAs)) of the drivers; or other types of communication devices or combinations thereof.

Although FIG. 1 shows exemplary components of mobile taxi dispatch service 100, in other embodiments, mobile taxi dispatch service 100 may include fewer, different, or additional components than depicted in FIG. 1. In still other embodiments, one or more components of mobile taxi dispatch service 100 may perform the tasks described as being performed by one or more other components of mobile taxi dispatch service 100.

Figure 2:
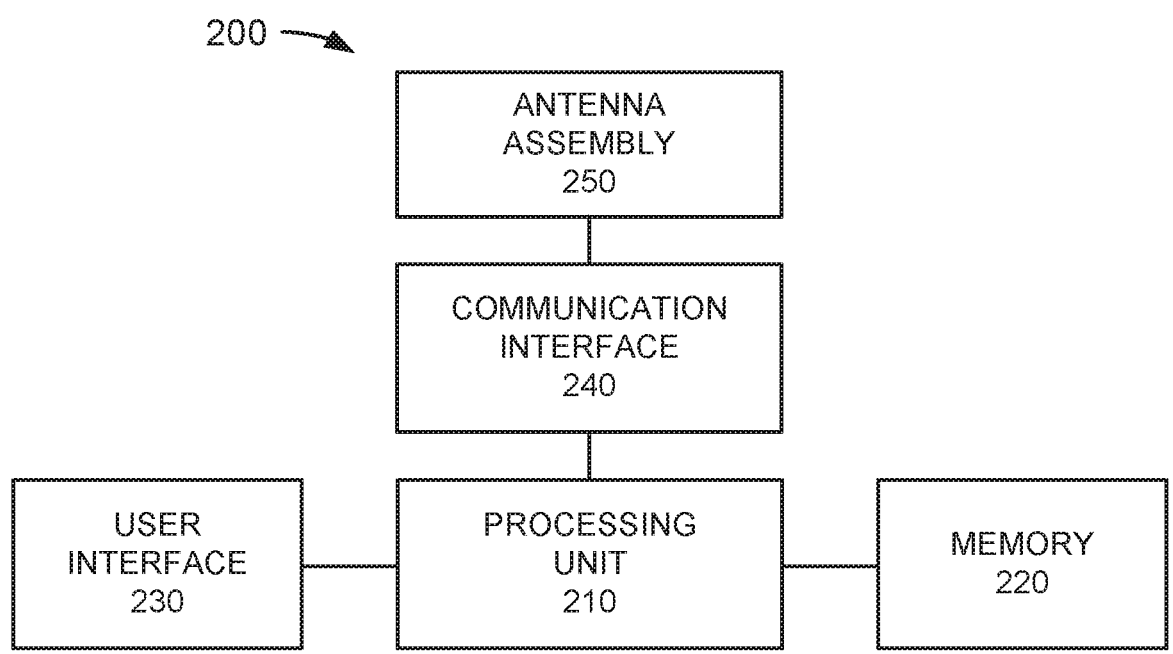
FIG. 2 is a diagram illustrating exemplary components of the user device, or of one of the taxi devices, depicted in FIG. 1.

FIG. 2 illustrates a diagram of exemplary components of a communication device 200. Communication device 200 may represent user device 110 or one of taxi devices 130a-130n. As shown in FIG. 2, communication device 200 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), or the like. Processing unit 210 may control operation of communication device 200 and its components.

Memory 220 may include a random access memory (RAM), a read only memory (ROM), and/or another type of memory to store data and instructions that may be used by processing unit 210.

User interface 230 may include mechanisms for inputting information to communication device 200 and/or for outputting information from communication device 200. Examples of input and output mechanisms might include a speaker to receive electrical signals and output audio signals; a camera lens to receive image and/or video signals and output electrical signals; a microphone to receive audio signals and output electrical signals; buttons to permit data and control commands to be input into communication device 200; a display to output visual information; and/or a vibrator to cause communication device 200 to vibrate.

Communication interface 240 may include any transceiver-like mechanism that enables communication device 200 to communicate with other devices and/or systems. For example, communication interface 240 may include a modem or an Ethernet interface to a local area network (LAN). Communication interface 240 may also include mechanisms for communicating via a network, such as a wireless network. For example, communication interface 240 may include, for example, a transmitter that may convert baseband signals from processing unit 210 to radio frequency (RF) signals and/or a receiver that may convert RF signals to baseband signals. Alternatively, communication interface 340 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 350 may, for example, receive RF signals from communication interface 240 and transmit them over the air and receive RF signals over the air and provide them to communication interface 240. In one implementation, for example, communication interface 240 may communicate with a network (e.g., a local area network (LAN), a wide area network (WAN), a telephone network, such as the Public Switched Telephone Network (PSTN), an intranet, the Internet, or a combination of networks).

As described herein, communication device 200 may perform certain operations in response to processing unit 210 executing software instructions contained in a computer-readable medium, such as memory 220. A computer-readable medium may be defined as a physical or logical memory device. A logical memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of communication device 200, in other implementations, communication device 200 may contain fewer, different, additional, or differently arranged components than depicted in FIG. 2. In still other implementations, one or more components of communication device 200 may perform one or more other tasks described as being performed by one or more other components of communication device 200.

Figure 3A:
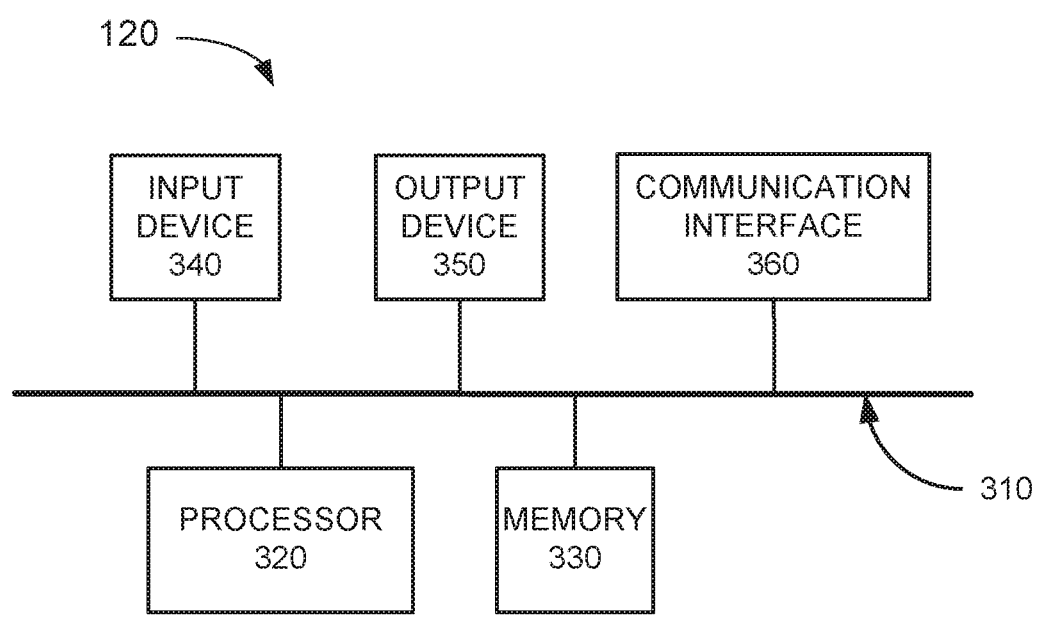
FIG. 3A is a diagram illustrating exemplary components of the mobile taxi dispatch system depicted in FIG. 1.

FIG. 3A is a diagram illustrating exemplary components of mobile taxi dispatch system 120 of FIG. 1. As illustrated, mobile taxi dispatch system 120 may include a bus 310, a processor 320, a memory 330, an input device 340, an output device 350, and/or a communication interface 360.

Bus 310 may include a path that permits communication among the components of mobile taxi dispatch system 120.

Processor 320 may include one or more processors, microprocessors, application specific integrated circuits (ASICs), field programmable gate arrays (FPGAs), or other types of processors that may interpret and execute instructions, programs, or data structures. Processor 220 may control operation of mobile taxi dispatch system 120 and its components.

Memory 330 may include a random access memory (RAM) or another type of dynamic storage device that may store information and/or instructions for execution by processor 320; a read only memory (ROM) or another type of static storage device that may store static information and/or instructions for use by processor 320; a flash memory (e.g., an electrically erasable programmable read only memory (EEPROM)) device for storing information and/or instructions; and/or some other type of magnetic or optical recording medium and its corresponding drive. Memory 330 may also be used to store temporary variables or other intermediate information during execution of instructions by processor 320. Instructions used by processor 320 may also, or alternatively, be stored in another type of computer-readable medium accessible by processor 320. A computer-readable medium may be defined as a physical or logical memory device. A logical memory device may include memory space within a single physical memory device or spread across multiple physical memory devices.

Input device 340 may include a mechanism that permits an operator to input information to mobile taxi dispatch system 120, such as a keyboard, a mouse, a pen, a microphone, voice recognition and/or biometric mechanisms, a touch screen, etc. Output device 350 may include a mechanism that outputs information to the operator, including a display, a printer, a speaker, etc.

Communication interface 360 may include any transceiver-like mechanism that enables mobile taxi dispatch system 120 to communicate with other devices and/or systems. For example, communication interface 360 may include a modem or an Ethernet interface to a local area network (LAN). Communication interface 360 may also include mechanisms for communicating via a network, such as a wireless network. For example, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver.

As described herein, mobile taxi dispatch system 120 may perform certain operations in response to processor 320 executing software instructions contained in a computer-readable medium, such as memory 330. The software instructions may be read into memory 330 from another computer-readable medium, such as a magnetic or optical recording medium and its corresponding drive, or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3A shows exemplary components of mobile taxi dispatch system 120, in other implementations, mobile taxi dispatch system 120 may contain fewer, different, differently arranged, or additional components than depicted in FIG. 3A. In still other implementations, one or more components of mobile taxi dispatch system 120 may perform one or more other tasks described as being performed by one or more other components of mobile taxi dispatch system 120.

Figure 3B:
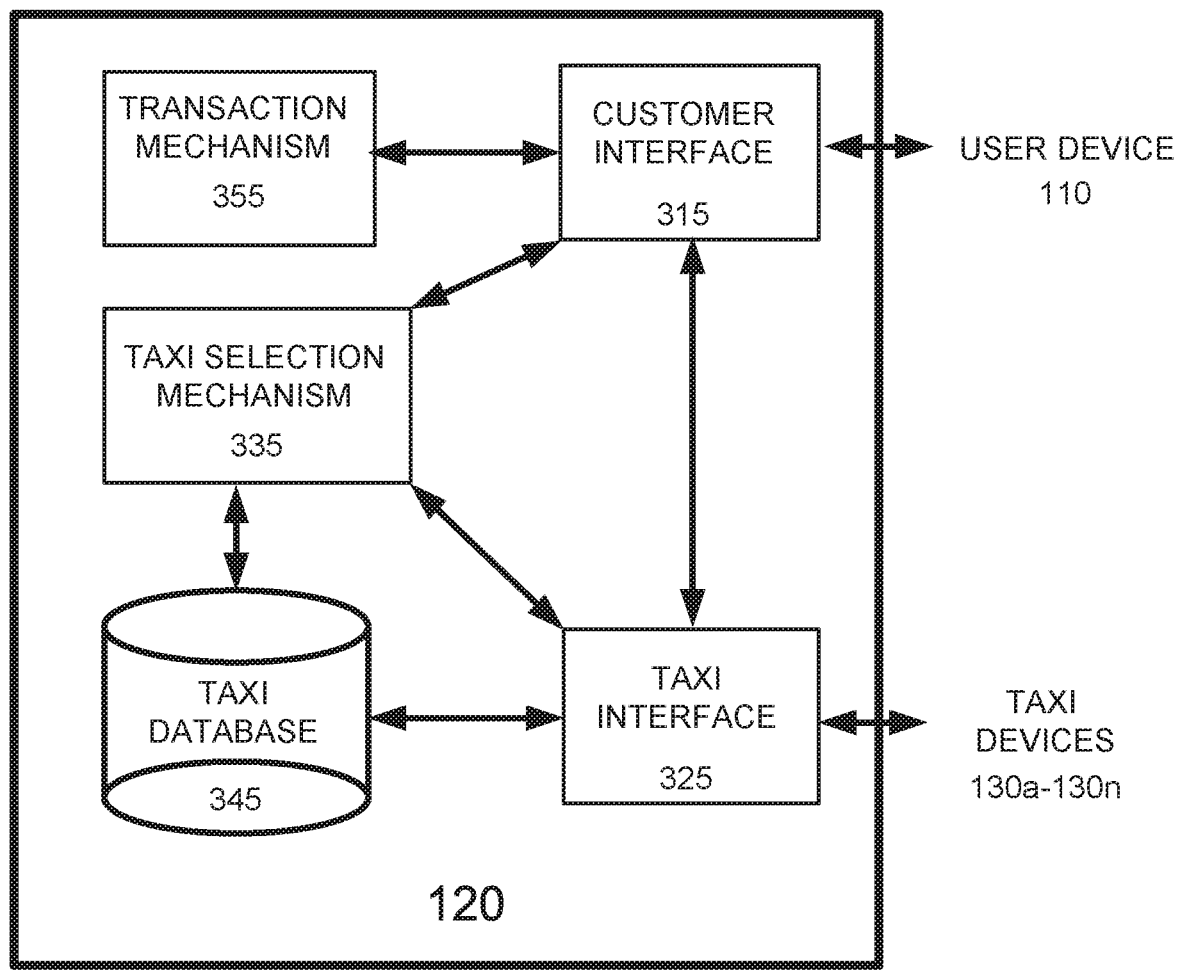
FIG. 3B is a diagram illustrating exemplary functional components of the mobile taxi dispatch system according to the implementations described herein.

FIG. 3B is a diagram illustrating exemplary functional components of a mobile taxi dispatch system 120 according to the implementations described herein. Mobile taxi dispatch system 120 may include a customer interface 315, a taxi interface 325, a taxi selection mechanism 335, a taxi database 345, and a transaction mechanism 355.

Customer interface 315 may allow mobile taxi dispatch system 120 to communicate with user device 110. Customer interface 315 may provide a graphical user interface to user device 110 and receive a request for a taxi when the user interacts with the graphical user interface. Customer interface 315 may forward the request to taxi interface 325. Customer interface 315 may automatically obtain information about the user of user device 110, such as a location of the user, or the user's preferences. The location of the user may be obtained, for example, from the request for a taxi, received from user device 110. Customer interface 315 may also query the user of user device 110 for information, such as the location of the user, the destination of the user, whether the user would like to share the ride, or whether the user would like to provide selection criteria for selecting a taxi. Customer interface 315 may forward any information received from the user to taxi selection mechanism 335.

Customer interface 315 may receive a selection of a particular taxi and a confirmation, such as a confirmation number, from taxi selection mechanism 335. Customer interface 315 may provide the confirmation to user device 110.

Customer interface 315 may provide billing information to the user and query whether the user would like to pay via user device 110. Additionally or alternately, customer interface 315 may query whether the user would like to leave a comment or rate the taxi. Customer interface 315 may perform any other functions which require interaction with the user of user device 110.

Taxi interface 325 may communicate with taxi devices 130*a*-130*n*. Taxi interface 325 may receive, from taxi selection mechanism 335, a list of taxis to contact in response to the request, and may forward the request to taxi devices 130*a*-130*n*. The forwarded request may include the user's location. Taxi interface 230 may also periodically receive taxi location information and availability information from taxi devices 130*a*-130*n*.

Taxi interface 325 may receive indications from particular ones of taxi devices 130*a*-130*n*, which have accepted the request. Taxi interface 325 may receive information that identifies the particular taxis associated with the indications, and forward the identification information and the indications to taxi selection mechanism 335.

Taxi interface 325 may also receive billing information from a taxi and provide the information to the user. For example, taxi interface 325 may receive a price for a ride from a taxi and provide the total to customer interface 315. The price may be obtained automatically, by taxi interface 325, from, for example, a meter installed in the taxi.

Taxi interface 325 may also receive registrations from new taxis or new drivers that would like to join mobile taxi dispatch system 120. A new taxi may apply to join mobile taxi dispatch system 120 by dialing a particular number or accessing a particular website. Taxi interface 325 may receive information from the new taxi and forward the information to transaction mechanism 355 to setup a new account.

Taxi selection mechanism 335 may receive a request for a taxi from customer interface 315, consult taxi database 345 for taxi information, based on the taxi information, select a list of taxis to which the request should be forwarded, and provide the list to taxi interface 325. Taxi selection mechanism 335 may select the list of taxis based on, for example, the location of the user making the request and the current locations of taxis, as stored in taxi database 345.

Taxi selection mechanism 335 may receive, from taxi interface 325, information that one or more taxis that have accepted the request for a taxi. Taxi selection mechanism 335 may select, from the taxis that have accepted the request, a single taxi based on one or more criteria. The criteria may include, for example, time to respond to the request, current location of a taxi, current direction of a taxi, a price quoted by the taxi, an average rating of a taxi, one or more customer preferences, and/or other criteria. Taxi selection mechanism 335 may forward information regarding the selected taxi to customer interface 315.

Taxi database 345 may store information associated with taxis that are registered with mobile taxi dispatch system 120. Additional details regarding exemplary information that may be stored in taxi database 345 is described below with reference to FIG. 4.

Transaction mechanism 355 may handle payment for a user. Customer interface 315 may provide an option to a user, before, during, or after a taxi ride, to pay for the taxi automatically via the user's communication device (i.e. user device 110). The user may need to have a previously set up account to be able to pay automatically. If a user indicates that the user would like to pay automatically, customer interface 315 may receive billing information from taxi interface 325 and provide the billing information to the user, along with an option to indicate a tip amount. Customer interface 315 may provide confirmation of the amount, along with a tip amount, to transaction mechanism 355. In one implementation, transaction mechanism 355 may handle the transaction directly. In this implementation, transaction mechanism 355 may maintain a database of customer accounts and a database of taxi accounts, and may transfer payment from a customer's account to a taxi account. In another implementation, transaction mechanism 355 may contact an accounting server, and provide information identifying the customer (i.e. the user of user device 110), the taxi, and the amount of the transaction to the accounting server.

Transaction mechanism 355 may additionally handle membership transactions for taxis that are registered with mobile taxi dispatch system 120. Mobile taxi dispatch system 120 may charge a membership fee to each taxi that is registered with mobile taxi dispatch system 120.

Although FIG. 3B shows exemplary functional components of mobile taxi dispatch system 120, in other implementations, mobile taxi dispatch system 120 may contain fewer, different, differently arranged, or additional functional components than depicted in FIG. 3B. In still other implementations, one or more functional components of mobile taxi dispatch system 120 may perform one or more other tasks described as being performed by one or more other functional components of mobile taxi dispatch system 120.

Figures 4, 5:
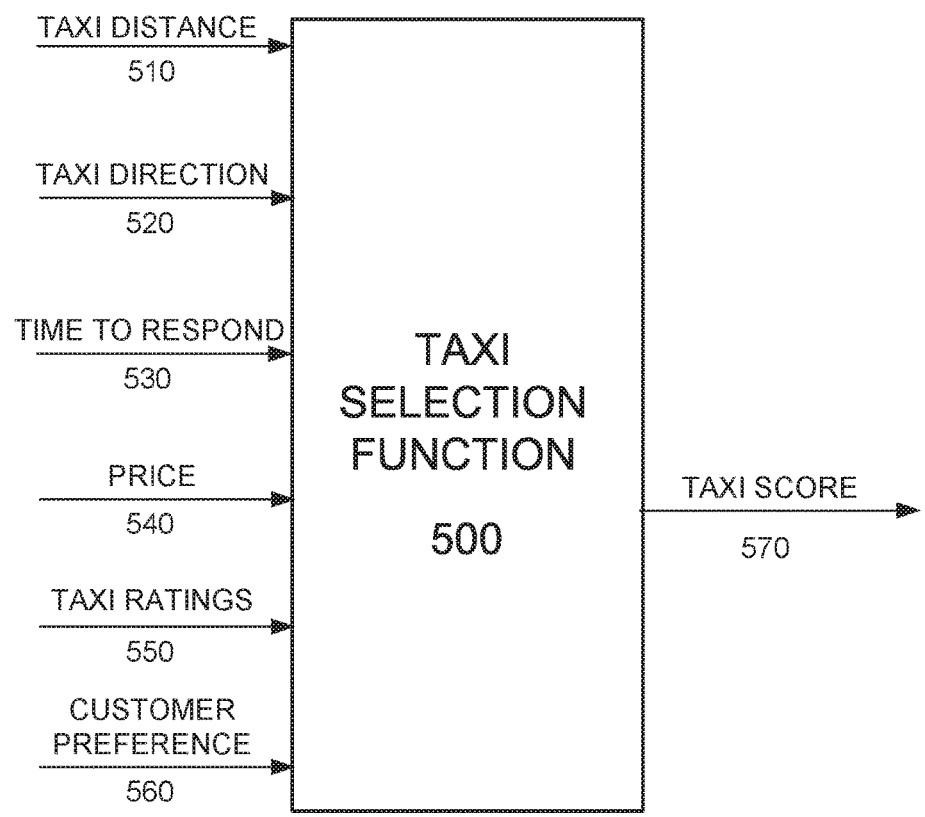
FIG. 4 is a diagram of exemplary fields that may be provided within the taxi database of FIG. 3.
FIG. 5 is a diagram of an exemplary taxi selection function implemented by the taxi selection mechanism of FIG. 3.

FIG. 4 is a diagram of exemplary fields that may be provided within a taxi database, such as taxi database 345 of FIG. 3B. Taxi database 345 may be implemented, for example, in a storage device included as part of memory 230. Taxi database 345 may store information associated with taxis that are members of a network served by mobile taxi dispatch system 120. Taxi database 345 may include, for example, a taxi identification field 410, a driver name field 420, an availability field 430, a current location field 440, a current direction field 450, and a ratings and comments field 460.

Taxi identification field 410 may store information that identifies a particular taxi vehicle. The information may include one or more of a unique identification string, a license plate number, a taxi registration number, information about the make and model of the vehicle, and/or any other information about the particular taxi vehicle.

Driver name field 420 may store information relating to a driver of the taxi vehicle identified in taxi identification field 410. The information may include a name of the driver. The information may additionally include a driver's profile. A driver's profile may include information about the driver, such as a length of time the driver has worked as a taxi driver or languages that the driver speaks.

Availability field 430 may store an indication whether or not the taxi identified in taxi identification field 410 is available. The taxi may not be available because the taxi is not in service; because the taxi driver is taking a break; because the taxi is currently carrying passengers; or because the taxi had a mechanical failure. In addition to storing an indication of availability, availability field 430 may store more specific information, such as why the taxi is not available. Such information may be useful, for example, for providing statistics to an administrator of mobile taxi dispatch system 120.

Current location field 440 may store information relating to a current location of the taxi identified in taxi identification field 410. The information may in the form of an address, such as a particular block of a particular street (e.g. $5^{th}$ Avenue, between $30^{th}$ and $31^{st}$ Streets), and/or in the form of a geographic code, such as a longitude and latitude code, or a triangular mesh grid code. The information may be provide by one or more of a GPS receiver included in one of taxi devices 130a-130n; information obtained from multiple base stations based on a multilateration process, such as Global System for Mobile Communications (GM) localization; information inputted by the driver of the taxi; or any other method of obtaining the location information of a vehicle.

Current direction field 450 may store information relating to a current direction of the taxi identified in taxi identification field 410. The information may be, for example, in the form of a direction on a particular street (e.g., heading north on $5^{th}$ Avenue), and/or in the form of a direction vector. The direction information may be obtained, for example, based on location information obtained at two different points in time; information obtained from a direction sensor located in the taxi vehicle; or information inputted by the driver of the taxi.

Ratings and comments field 460 may store information relating to comments and/or ratings that previous customers have provided. Customers may be given the opportunity to leave a comment about their experience, after using a particular taxi. Customers may also be given the opportunity to rate their experience. For example, customers may rate a taxi on a multiple point scale, such as a five point scale, where one point indicates a very low rating and five points indicate a very high rating. Ratings and comments field 460 may store an average of ratings submitted by customers of the particular taxi. In one implementation, the comments and ratings may be associated with the taxi identified in taxi identification field 410. In another implementation, the comments and ratings may be associated with the driver identified in driver name field 420. In such an implementation, if the driver switches to a different taxi vehicle, the comment and average rating stored in ratings and comments field 460 may be transferred to a record associated with the new vehicle along with the driver. Thus, ratings and comments field 460 may be associated with a driver's profile.

Taxi database 345 may be updated by taxi selection mechanism 335, or by another component implemented in mobile taxi dispatch system 120. Taxi database 345 may be updated at particular intervals, such as, for example, once every minute. For example, mobile taxi dispatch system 120 may receive periodic updates from taxis registered with mobile taxi dispatch system 120. The updates may include a current location and a current direction of the taxis, as well as whether the taxi is available.

Although FIG. 4 shows exemplary fields that may be stored in taxi database 345, in other implementations, taxi database 345 may contain fewer, different, differently arranged, or additional fields than depicted in FIG. 4. Taxi database 345 may consist of multiple databases stored locally at mobile taxi dispatch system 120, or stored at one or more different and possibly remote locations.

FIG. 5 is an exemplary diagram of a taxi selection function implemented by taxi selection mechanism 335. Taxi selection function 500 may be implemented, for example, by processor 220, memory 230, and communication interface 260. Taxi selection function 500 may include a taxi distance input 510, a taxi direction input 520, a time to respond input 530, a price input 540, a taxi ratings input 550, a customer preference input 560, and a taxi score output 570.

Taxi distance input 510 may include information about how far a particular taxi is located from the customer that is requesting the taxi. This information may be computed, for example, from information about the location of the customer making the request and from information about the current location of taxis stored in taxi database 345. In one implementation, location information about the customer and about taxis may be in the form of a hierarchical grid, and taxi distance input 510 may include information about whether the customer and particular taxis are located within a same cell of the hierarchical grid. In another implementation, location information about the customer and about taxis may be in the form of coordinates, and taxi distance input 510 may include values representing distances between the customer and particular taxis. Providing distances of taxis from the customer as an input to taxi selection function 500 may allow selection of taxis that are close to the customer and are likely to arrive fast to pick up the customer.

Taxi direction input 520 may include information about a direction in which a particular taxi is driving, compared to the location of the customer. A current direction of a taxi may be obtained from taxi database 345 and may be compared with information about the side of a street on which a customer is standing. This information may be beneficial in locations with heavy traffic, such as main streets in urban areas, where it may be difficult for a customer to cross the street to meet a taxi. Providing a direction in which a taxi is driving as an input to taxi selection function 500 may allow selection of taxis that will be driving on the same side of the street as the customer, to allow for easy pickup of the customer.

Time to respond input 530 may include information about the amount of time that it took a taxi to respond to a request from a customer. This information may be used as an input to taxi selection function 500 to provide a sense of fairness, by using a first-come-first-serve system. Thus, taxis that responded faster to the request may be given priority.

Price input 540 may include information that a taxi provided about how much a ride would cost the customer. This information may be used in conjunction with a quote system available if a customer provided a destination. For example, taxi interface 325 may provide, to taxi devices 130a-130n, the destination of the customer along with the request for a taxi, and may receive, in response, an estimated price of the ride to the requested destination. This may allow particular taxis to bid for the customer's business by providing better prices than competitors. Providing a price quoted by a taxi as an input to taxi selection function 500 may allow selection of a taxi based on a quoted price. This may be particularly important for rides over long distances. For example, a customer that is looking for a ride to a nearby neighborhood may not be as concerned about the price as a customer that is looking for a ride to an airport.

Taxi ratings input 550 may include average ratings of particular taxis, based on ratings that have been previously provided by other customers. Ratings information may be retrieved from taxi database 345. Providing an average rating as an input to taxi selection function 500 may give preference to taxis which have been highly rated, thereby rewarding taxis that provide better customer service while giving a customer a better experience.

Customer preference input 560 may include information about a customer's preferences. A customer's preferences may be obtained from the customer along with a request for a taxi. The preferences may include information such as a customer's preference for a particular taxi, type of vehicle, or a language of the driver of a taxi. A customer may have used a particular taxi and/or driver in the past and enjoyed the experience. The customer may indicate that the particular taxi is a preferred taxi, and if that taxi is available and in the vicinity of the customer when the customer requests a taxi, the particular taxi may be given a preference. Alternately, a customer may have disliked a particular taxi and may indicate that the customer would like to exclude the particular taxi from consideration. A customer may also prefer a certain type of vehicle, such an environmentally friendly car (i.e. a hybrid car), and such vehicles may be given preference. A customer may also prefer a driver that speaks a particular language, and drivers of taxis that speak the particular language may be given preference. Thus, a customer's preferences may be compared with a driver's profile (which may be included in driver name field 420). A customer may also indicate that the customer would prefer to share the ride with other customers. Providing a customer's preferences as an input to taxi selection function 500 may provide a better taxi riding experience for the customer by tailoring the ride to the customer's individual preferences.

Taxi score output 570 may provide a score for each taxi that responded to a request from a customer. The taxi score may be computed based on the input parameters 510-560. In one implementation, input parameters 510-560 may include weights and the taxi score may be based on a weighted average. For example, each input value may be multiplied by the associated weight and the weighted values may be added and divided by the number of inputs. The input parameters may have different scales, and therefore the values may be normalized before the values are combined. In another implementation, particular ones of inputs 510-560 may provide a boost to the taxi score. The inputs to taxi selection function 500 may be combined in any number of ways to compute the taxi score. For example, in one exemplary implementation, only taxi distance 510 and time to response 530 may be used as inputs to select a taxi.

Taxi selection mechanism 335 may rank taxis based on taxi scores received from taxi selection function 500, may select the taxi with the highest score as the taxi which will respond to the request, and may generate a confirmation which will be sent to both the customer and the selected taxi. Alternately, taxi selection mechanism 335 may provide a ranked list of taxis to the user for selection, and may receive a selection of a particular taxi from the ranked list from the user.

Although FIG. 5 shows exemplary inputs and outputs of taxi selection function 500, in other implementations, taxi selection function 500 may include fewer, different, or additional inputs and outputs than depicted in FIG. 5.

FIG. 6A is a flow diagram illustrating a process for dispatching a taxi according to an exemplary implementation. FIGS. 6B and 6C illustrate an exemplary customer interface in accordance with the process of FIG. 6A. In one embodiment, the process of FIG. 6A may be performed by mobile taxi dispatch system 120. In other embodiments, some or all of the process of FIG. 6A may be performed by another device or group of devices.

Processing may begin with receiving a request for a taxi from a customer (block 610). In one implementation, prior to requesting a taxi, a customer may have obtained a program that includes a graphical user interface that allows a customer to request a taxi. The program may be part of an application that a customer may download and install on user device 110 by, for example, contacting mobile taxi dispatch system 120 via a particular web site associated with mobile taxi dispatch system 120.

In one implementation, the user interface of the downloaded program may take the form of a taxi icon 615 (FIG. 6B) that may be provided on a touch screen of user device 110. A request for a taxi may be automatically transmitted, by user device 110, when a customer touches the icon with a finger or a stylus. The taxi request message may be transmitted to a network address associated with mobile taxi dispatch system 120. Alternately or additionally, the user interface of the program may include an item to request a taxi in a drop down menu, code to recognize a voice command, or any other function to recognize user input. For example, the user may be provided with a voice command function, which may be part of an application that a customer may download and install on user device 110. A request for a taxi may be automatically transmitted, by user device 110, when a customer voices a particular command.

In other implementations, a customer may request a taxi by methods that do not involve a dedicated user interface, such as by activating a dedicated button on user device 110, dialing a particular set of digits (that may be less in number than a full phone number), calling a contact from an address book, or any other pre-existing method of sending messages from user device 110.

In response to receiving the request, an indication 625 (FIG. 6B) may be provided, informing the customer that the request has been received and that a taxi is being requested. If a taxi icon is provided, indication 625 may take the form of a tooltip or dialog box that appears in association with taxi icon 615, or a change in the appearance of taxi icon 615. Alternately or additionally, indication 625 may take other forms, such as, for example, a text message, image, an animation, an audible message, or a video clip.

In response to receiving a request for a taxi, mobile taxi dispatch system 120 may query the customer for additional information, such as information that may be used in selecting a taxi for the customer. A process of querying the customer for information is explained below with reference to FIG. 7.

In connection with receiving the request for a taxi from the customer, a location associated with the customer may be received. In one implementation, the location information may be obtained automatically along with the request. For example, in response to detecting a request for a taxi, user device 110 may capture the current location of user device 110 and transmit information about the current location to mobile taxi dispatch system 120 along with the request. In another implementation, the location information may be obtained by querying user device 110. For example, customer interface 410 may send a request to user device 110 for the location information in response to receiving the request for a taxi.

Additional information may be provided along with the request, such as information that will allow a taxi driver to identify the customer. For example, user device 110 may automatically provide a previously stored picture of the customer, may automatically capture a picture of the customer, or may ask the customer whether the customer would like to send a picture. The picture may be provided to the driver of the taxi, so that the driver may identify the customer. Alternately or additionally, user device 110 may provide a description of the customer and/or other people that may be sharing the ride with the customer.

One or more taxis may be selected (block 620). The selection of taxis may be based on predefined criteria, such as distance from the customer and availability. For example, taxi selection mechanism 420 may consult taxi database 430 to select taxis that are within a particular distance of the customer and that are available, based on current location field 440 and availability field 430 of taxis in taxi database 430. The particular distance may be based on an estimated time it would take a taxi to reach the customer's location, such as, for example, five minutes.

A request may be sent to the selected taxis (block 630). For example, taxi interface 325 may forward the request to the particular ones of taxi devices 130a-130n of taxis that have been selected to be contacted with respect to the request. The request forwarded to the particular ones of taxi devices 130a-130n may include a location of the customer and a query asking whether the driver would like to accept the request. The request may additionally include a destination of the customer and may include a query asking the driver for a price to the destination. The driver may accept, deny, or ignore the request. If the driver accepts the request, the driver may provide a price for the ride.

Responses from one or more taxis may be received (block 640). For example, taxi interface 325 may receive indications from drivers of particular taxis, via their corresponding one of taxi devices 130a-130n, that the drivers would like to accept the request and pick up the customer. The response may also include indications that particular drivers have denied the request. Taxi interface 325 may wait a particular amount of time to receive the indications, before forwarding the indications (along with any provided prices) to taxi selection mechanism 335.

A particular taxi may be selected from the taxis that accepted the request (block 650). In one implementation, taxi selection mechanism 335 may select a taxi based on one or more criteria. All the criteria may be predefined. Alternately or additionally, one or more (possibly all) of the criteria may be defined by the customer. The criteria may include a distance of a particular taxi from the customer, a direction of the taxi in relation to the customer's location, the time it took the taxi to response to the request, a price that the driver of the taxi quoted based on a destination provided by the customer, an average rating of the taxi, or preferences provided by the customer. For example, taxi selection mechanism 335 may compute taxi score 570 for each of the taxis that accepted the request, and select the taxi with the highest corresponding taxi score. In an exemplary implementation, taxi selection mechanism 335 may compute the taxi score based on a distance from the customer and based on the time it took taxis to respond to the request. Thus, taxi selection mechanism 335 may select the taxi that is the closest to the customer, and if more than one taxi is within the closest distance, taxi selection mechanism 335 may select the taxi that responded sooner.

In other implementation, taxi selection mechanism 335 may not automatically select a taxi. Rather, taxi selection mechanism 335 may rank taxis based on the one or more criteria, and provide the ranked list, along with the associated criteria, to the customer. The customer may then select one of the taxis from the ranked list.

A confirmation number may be provided to the customer and to the selected taxi (block 660). If taxi icon 615 has been provided, confirmation 665 (FIG. 6C) sent to the customer may take the form of a tooltip or dialog box that appears in associated with taxi icon 615, or a change in the appearance of taxi icon 615. Alternately or additionally, confirmation 665 may take other forms, such as, for example, a text message, image, an animation, an audible message, or a video clip. Confirmation 665 may include a countdown counter that indicates an estimated amount of time before the taxi arrives at the customer's location, identification information associated with the taxi, such as a taxi number, and/or a unique identification string associated with the confirmation, such as a confirmation number.

Confirmation to the taxi may include the same confirmation number. In addition, the confirmation to the taxi may include additional information, if available, such as information relating to the customer (e.g., the number of people in the customer's party, what the customer is wearing, and/or other information that allows the taxi driver to identify the customer). Providing a confirmation number may ensure that the taxi is not taken by another customer that happens to be looking for a taxi in the same location and approaches the taxi when the taxi arrives. The customer that requested the taxi may show the confirmation number as proof that the customer requested the taxi and is entitled to the taxi.

Figure 7A:
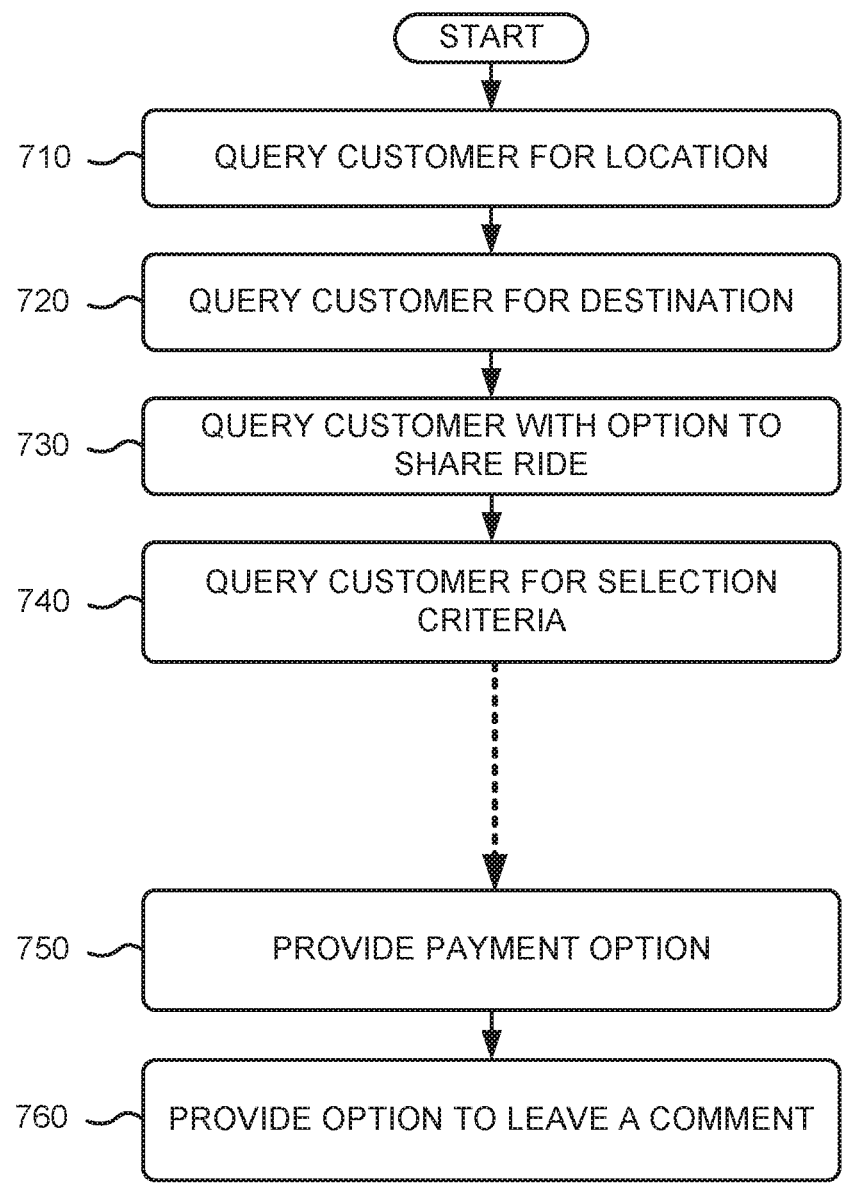
FIG. 7A is a flow diagram illustrating a process for interacting with a customer requesting a taxi according to an exemplary implementation.
Figure 7B:
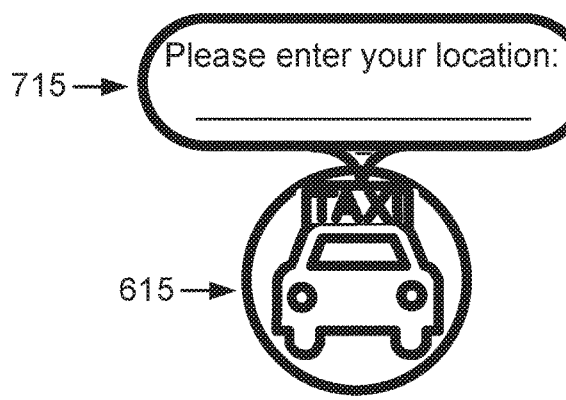
FIGS. 7B-7G illustrate an exemplary customer interface in accordance with the process of FIG. 7A.
Figure 7C:
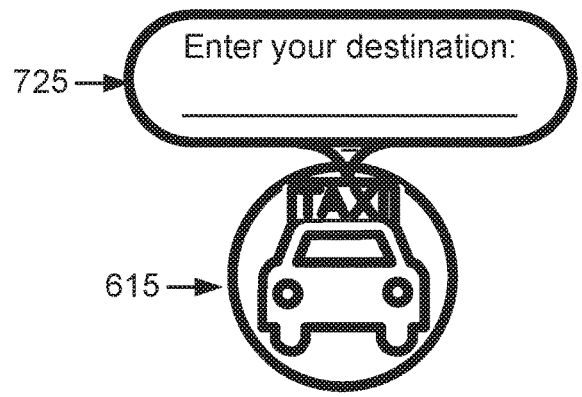
Figure 7D:
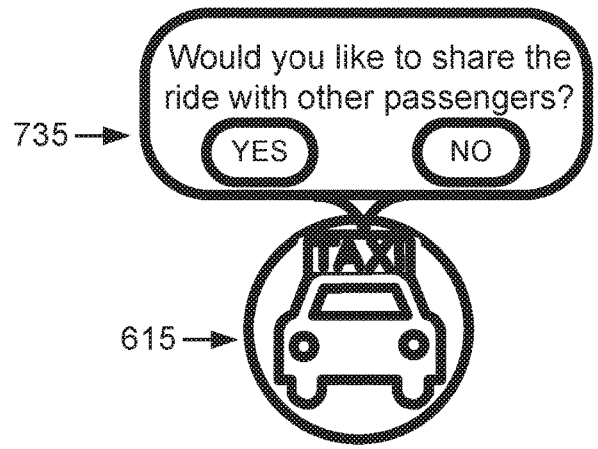
Figure 7E:
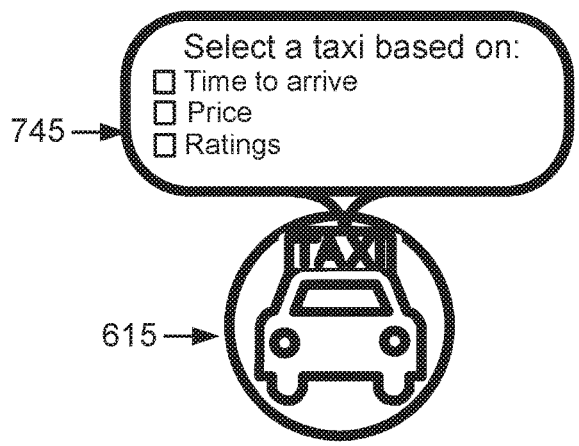
Figure 7F:
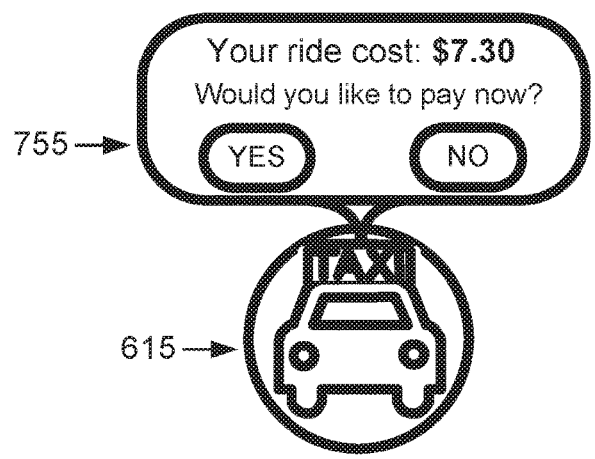
Figure 7G:
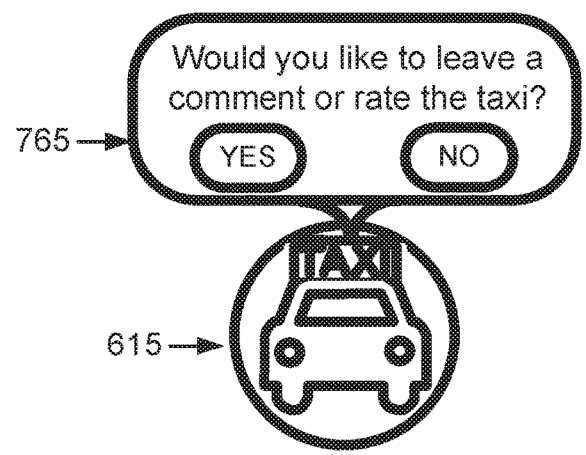

FIG. 7A is a flow diagram illustrating a process for interacting with a customer requesting a taxi according to an exemplary implementation. Any of the blocks illustrated in the flow diagram of FIG. 7A may be incorporated into the process illustrated in FIG. 6A individually, or in combination with any of the other blocks of FIG. 7A. For example, blocks 710-740 may be part of block 610. Blocks 750-760 may take place subsequent to block 660, for example, at the completion of the ride. In one embodiment, the process of FIG. 7A may be performed by mobile taxi dispatch system

120. In other embodiments, some or all of the process of FIG. 7A may be performed by another device or group of devices.

FIGS. 7B-7G illustrate an exemplary customer interface in accordance with the process of FIG. 7A. The customer interface may include taxi icon 615 on a touch screen of user device 110, and queries to the customer may take the form of a tooltip or dialog box that appears in associated with taxi icon 615. While the queries illustrated in FIGS. 7B-7G are associated with taxi icon 615, alternately or additionally, queries to the customer may take other forms, such as, for example, as a text message, an image, an animation, an audible message, or a video clip.

Processing of FIG. 7A may begin with querying the customer for a location (block 710). For example, customer interface 315 may provide a location request 715 (FIG. 7B) to user device 110, requesting a location at which the customer is located. A customer may type in the location, such a street address. Providing a location may be useful in situations where a customer's location cannot be determined automatically by user device 110. For example, a GPS receiver in the customer's user device 110 may not be functioning, or may simply not be available. A customer may also be able to provide more specific information than may be available via a GPS receiver, such as what side of the street the customer is standing, or a specific street number.

The customer may be queried for a destination (block 720). For example, customer interface 315 may provide a destination request 725 (FIG. 7C), requesting a destination to which the customer is requesting the taxi to drive. Providing a destination may be useful if a customer desires to know how much a taxi ride would cost to reach a destination. Mobile taxi dispatch system 120 may provide the destination to the selected taxi devices along with the request, and the contacted taxi devices may provide an estimated price for the trip to that destination. A customer may also desire the cheapest taxi available, and mobile taxi dispatch system 120 may subsequently be able to select a taxi based on the provided price.

The customer may be queried with an option to share the ride (block 730). For example, customer interface 315 may provide a share ride query 735 (FIG. 7D) to the customer, asking if the customer would like to share the ride. If the customer indicates 'yes,' mobile taxi dispatch system 120 may determine whether there are other customers within the vicinity (e.g. within a particular distance) of the customer that are currently requesting taxis that are headed to the same destination (or destinations located within a particular distance of each other). If mobile taxi dispatch system 120 detects other customers in the vicinity of the customer and headed to the same destination, mobile taxi dispatch system 120 may send a message to all the customers to proceed to a particular location to await pickup by a taxi. For example, assume that three different customers, located within a block of $20^{th}$ Street and $5^{th}$ Avenue, in New York, all wish to go to Times Square (West $42^{nd}$ Street and $7^{th}$ Avenue). Mobile taxi dispatch system 120 may select a single taxi for all three customers and send a message to each customer, stating "Please proceed to the corner of $20^{th}$ Street and $5^{th}$ Avenue to wait for your taxi. You will be sharing the ride with two other customers." Providing a customer with an option to share a ride may save the customer money by splitting the cost of the ride with other customers, and may further save gas and reduce pollution by using a single taxi instead of multiple taxis. Furthermore, the customers may feel safe sharing a ride, because mobile taxi dispatch system 120 will store identification information associated with each customer.

The customer may be queried for selection criteria (block 740). For example, customer interface 315 may provide a criteria selection query 745 (FIG. 7E) to the customer with checkboxes, asking the customer to select which criteria to use to select a taxi. The criteria may include, for example, the time it would take a taxi to arrive, a price quoted by a taxi, or ratings given to a taxi by other customers. Providing a customer with an option to select criteria with which to select a taxi may allow a customer to select a particular taxi based on the customer's needs. For example, a customer may be in a hurry, and therefore the time that a taxi will take to pick up the customer may be most important. As another example, a customer may be looking for the cheapest taxi available. As yet another example, a customer may want a taxi with high customer satisfaction, and may choose to select a taxi based on the taxi's ratings.

A customer may be provided with a payment option (block 750). For example, customer interface 410 may provide a payment query 755 (FIG. 7F) that may include a bill for the ride. Customer interface 410 may provide the bill based on information received from taxi interface 325, which may in turn automatically obtain billing information from a taxi meter located in the taxi. Alternately, customer interface 410 may provide the bill based on a quote that was originally provided by the taxi driver in response to the request for a taxi from the customer. If the customer indicates that the customer would like to pay via user device 110, customer interface 410 may forward the billing information to transaction mechanism 355. Transaction mechanism 355 may interact with the customer via customer interface 410, or via a different customer interface, to obtain payment from the customer.

After a taxi arrives at the customer's destination, a customer may be provided with an option to leave a comment and/or a rating (block 760). For example, customer interface 410 may provide a comment query 765 (FIG. 7G), asking the customer whether the customer would like to leave a comment or rate the taxi. If the customer indicates 'yes,' the customer may be provided with an entry box to leave a comment, and the customer may be provided with an option to enter a rating. For example, a customer may be asked to select a rating based on a particular scale, such a five point scale. A customer may be additionally given the option of saving the taxi as a preferred taxi, or as a taxi to be excluded, when future requests for a taxi are placed by the customer.

Figure 8:
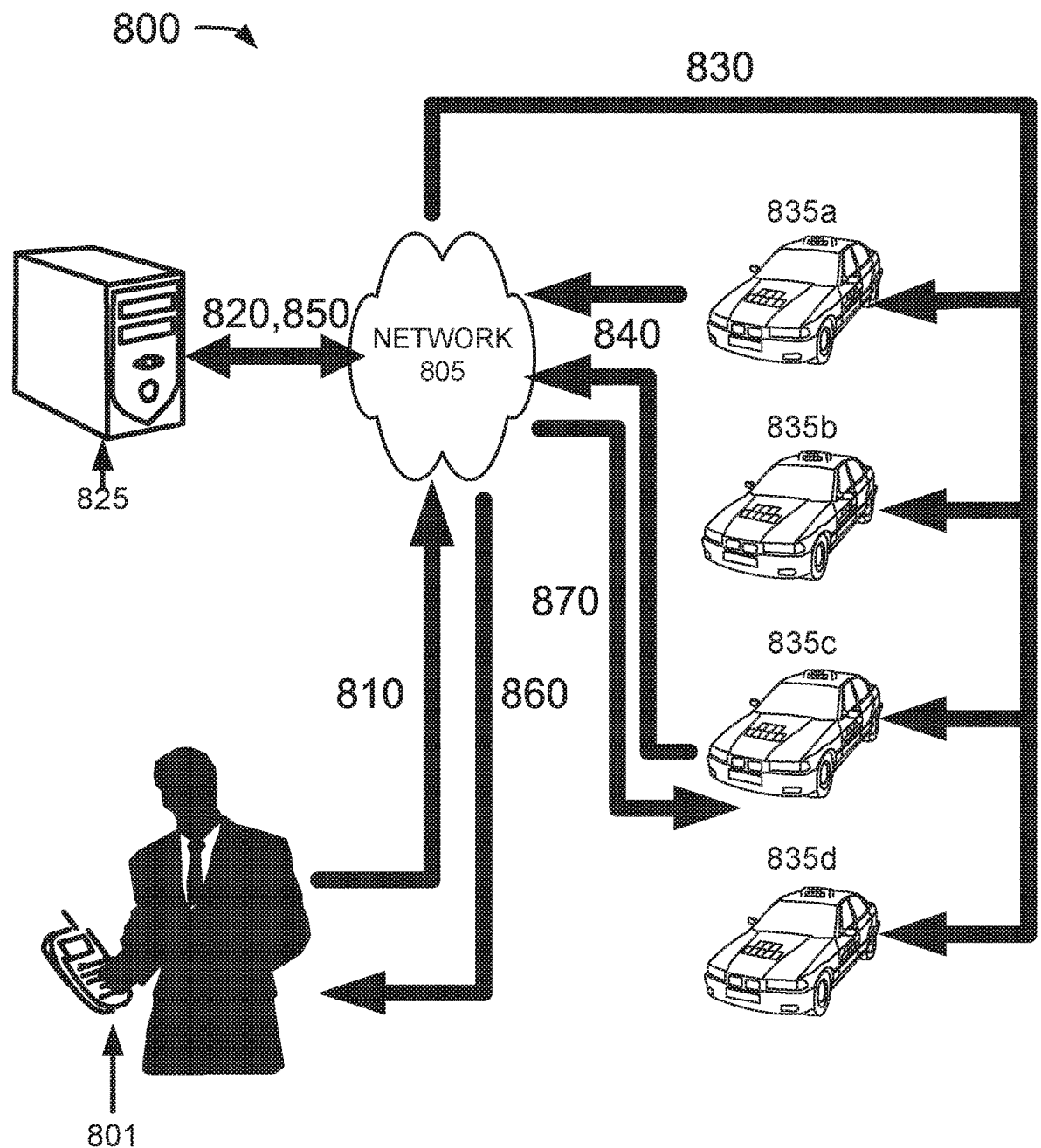
FIG. 8 illustrates an exemplary implementation of a mobile taxi dispatch system.

FIG. 8 is a diagram illustrating an example 800 of an exemplary implementation of mobile taxi dispatch service 100.

For example 800, a user may request a taxi by pressing a dedicated button, or an icon located on a touch screen, of a mobile phone 801. Mobile phone 801 may send the request, via a wireless connection, to network 805 (arrow 810). Network 805 may send the request to server 825 (arrow 820). Server 825 may receive the request from network 805 and may select one or more taxis to contact. Server 825 may, for example, select all taxis within a particular distance of the user. Network 805 may forward the request to selected taxis 835a-835d. Assume that, in this example, network 805 forwards the request to taxis 835a-835d (arrow 830). One or more of the contacted taxis may accept the request by replying to the request. Assume that, in this example, taxi 835a and taxi 835c have replied to the request (arrow 840).

Network 805 may forward the replies to server 825 (arrow 850). Server 825 may select a taxi from the taxis that replied based on one or more criteria. The criteria may include one or more of a distance from the user, a direction in which a taxi is driving, an order in which the taxi replied to the request, an estimation of price for the trip provided by a particular taxi cab, ratings associated with particular taxis, or one or more preferences of the user. Assume that in this example, server 825 has selected taxi 835c.

Server 825 may forward, via network 805, a confirmation to mobile phone 801 (arrow 860). Server 825 may also forward a confirmation, via network 805, to taxi 835c, indicating to taxi 835c that taxi 835c should proceed to pick up the user at the user's determined location (arrow 870).

From a passenger's point of view, a taxi mobile dispatch service according to implementations described herein may improve the ease with which a passenger can find a taxi; may cost less than other vehicle services; and may provide higher safety due to the ability to track data. From a taxi driver's point of view, a taxi mobile dispatch service according to implementations described herein may provide savings in time and gas, which a taxi driver might otherwise waste looking for passenger to pick up; may provide a membership cost which may be less expensive than a taxi dispatch system staffed by live operators; may improve location accuracy through the use of global positioning satellite (GPS) receivers; may provide instant interactions between a taxi driver and a passenger via a server; may provide higher safety to a taxi driver by recording passenger information; and may provide higher revenue to the taxi driver by providing more customers to the taxi driver than a taxi driver would be able to find otherwise.

Implementations described here may provide a mobile taxi dispatch system that allows customer to request a taxi using a communication device, such as a mobile phone. The customer may request a taxi by pressing an icon or otherwise activating a dedicated command on the device to request a taxi. A server may select taxis that are in the vicinity of the customer and may forward the request to the selected taxis. The server may receive acceptance messages from one or more of the taxis and may select a taxi from the taxis that responded based on one or more criteria, such as distance from the customer. The server may provide a confirmation to the customer and to the selected taxi, indicating to the customer that a taxi has been selected and is on the way, and indicating to the taxi that the taxi has been selected to pick up the customer.

In the preceding description, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative, rather than restrictive, sense.

Furthermore, while series of blocks have been described with respect to FIGS. 6A and 7A, the order of the blocks may be modified in other implementations. Further, non-dependent blocks may be performed in parallel.

Still further, aspects have been mainly described in the context of a server device. However, the device and methods described herein may be implemented using other devices. For example, part or all of mobile taxi dispatch system 120 may be implemented in user device 110.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain aspects described herein may be implemented as "logic" that performs one or more functions. This logic may include hardware, such as a processor, microprocessor, an application specific integrated circuit or a field programmable gate array, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. One or more servers comprising:
   one or more communication interfaces, implemented at least partially in hardware, configured to communicate with one or more of a mobile device or a device of a vehicle; and
   a selection mechanism, implemented at least partially in the hardware, configured to:
      determine whether the vehicle is environmentally friendly; and
      determine a score for the vehicle based on whether the vehicle is environmentally friendly; and
      select, from a plurality of vehicles that provide taxi service, the vehicle based on the score,
         the plurality of vehicles including the vehicle, and
         the one or more communication interfaces being to one or more of:
            provide a first confirmation to the mobile device based on the vehicle being selected, or
            provide, based on the vehicle being selected, a second confirmation to the device of the vehicle.

2. The one or more servers of claim 1,
   wherein, when determining the score for the vehicle, the selection mechanism is configured to:
      determine a value for the vehicle based on whether the vehicle is environmentally friendly, and
   wherein the score is determined based on the value.

3. The one or more servers of claim 2,
   wherein the vehicle is a first vehicle,
   wherein the score is a first score,
   wherein the selection mechanism is further configured to:
      determine a second score for a second vehicle, and
   wherein the first vehicle is selected based on the first score and the second score.

4. The one or more servers of claim 3, wherein the first vehicle is selected based on the first score being higher than the second score.

5. The one or more servers of claim 1, wherein the selection mechanism is further configured to:
   select the vehicle and one or more other vehicles to contact based on the vehicle and the one or more other vehicles being within a particular distance from a user of the mobile device.

6. The one or more servers of claim 1, wherein the plurality of vehicles accepted a request that includes information regarding providing the taxi service to a user of the mobile device.

7. The one or more servers of claim 1, wherein the plurality of vehicles are selected as vehicles to contact before the vehicle is selected from the plurality of vehicles.

8. The one or more servers of claim 1,
   wherein the first confirmation is provided to a plurality of mobile devices of users that indicated a preference to share a ride, and
   wherein the plurality of mobile devices include the mobile device.

9. The one or more servers of claim 1, wherein the vehicle is selected further based on information obtained from multiple base stations based on a multilateration process.

10. A method comprising:
    determining, by one or more servers, whether a vehicle is environmentally friendly;
    determining, by the one or more servers, a score for the vehicle based on whether the vehicle is environmentally friendly;
    selecting, by the one or more servers and for a user of a mobile device, the vehicle, from a plurality of vehicles that provide taxi service, based on the score, the plurality of vehicles including the vehicle; and
    providing, by the one or more servers and based on selecting the vehicle, one or more of:
      a first confirmation to the mobile device based on the vehicle being selected, or
      a second confirmation to a device of the vehicle.

11. The method of claim 10, further comprising:
    selecting the vehicle and one or more other vehicles to contact based on the vehicle and the one or more other vehicles being within a particular distance from the user of the mobile device.

12. The method of claim 10, wherein the plurality of vehicles accepted a request that includes information regarding providing the taxi service to the user of the mobile device.

13. The method of claim 10, wherein the plurality of vehicles are selected as vehicles to contact before the vehicle is selected from the plurality of vehicles.

14. The method of claim 10,
    wherein the first confirmation is provided to a plurality of mobile devices of users that indicated a preference to share a ride,
    wherein the users include the user of the mobile device, and
    wherein the plurality of mobile devices include the mobile device.

15. The method of claim 10, wherein the vehicle is selected further based on information obtained from multiple base stations based on a multilateration process.

16. A non-transitory computer-readable medium storing instructions, the instructions comprising:
    one or more instructions that, when executed by one or more processors, cause the one or more processors to:
      determine whether a vehicle is environmentally friendly; and
      determine a score for the vehicle based on whether the vehicle is environmentally friendly; and
      select, from a plurality of vehicles that provide taxi service, the vehicle based on the score, the plurality of vehicles including the vehicle; and
      provide, based on selecting the vehicle, one or more of:
        a first confirmation to a mobile device based on the vehicle being selected, or
        a second confirmation to a device of the vehicle.

17. The non-transitory computer-readable medium of claim 16, wherein the one or more instructions, when executed by the one or more processors, further cause the one or more processors to:
    select the vehicle and one or more other vehicles to contact based on the vehicle and the one or more other vehicles being within a particular distance from a user of the mobile device.

18. The non-transitory computer-readable medium of claim 16, wherein the plurality of vehicles accepted a request that includes information regarding providing the taxi service to a user of the mobile device.

19. The non-transitory computer-readable medium of claim 16,
    wherein the first confirmation is provided to a plurality of mobile devices of users that indicated a preference to share a ride, and
    wherein the plurality of mobile devices include the mobile device.

20. The non-transitory computer-readable medium of claim 16, wherein the vehicle is selected further based on information obtained from multiple base stations based on a multilateration on process.

* * * * *